Figure 2:
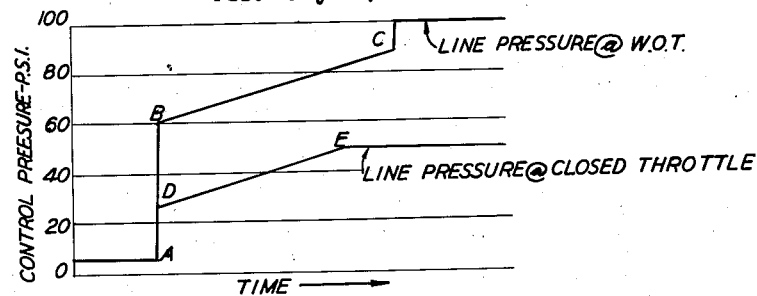

Jan. 3, 1961 Z. J. JANIA ET AL 2,966,888
TRANSMISSION CONTROL SERVO
Filed May 23, 1956

ZBIGNIEW J. JANIA
OCIE K. WALTHALL
INVENTORS

BY E. C. McRae
J. R. Faulkner
D. J. Harrington
ATTORNEYS 2,966,888
Patented Jan. 3, 1961

2,966,888

TRANSMISSION CONTROL SERVO

Zbigniew J. Jania, Detroit, and Ocie K. Walthall, Dearborn, Mich., assignors to Ford Motor Company, Dearborn, Mich., a corporation of Delaware Filed May 23, 1956, Ser. No. 586,831

14 Claims. (Cl. 121—38)

Our invention relates generally to improvements in power transmission mechanisms and more particularly to a means for controlling the motion of the gear elements of multiple speed transmissions to effect an appropriate change in the effective speed ratio. Although the structure of our instant invention finds particular utility in multiple speed transmissions for motor vehicles, we contemplate that it may also be used in a variety of other installations with equal success.

We are aware of various types of automatic transmissions employing pressure responsive mechanisms for selectively braking the various gear elements thereof and for clutching certain components of the mechanism together to accommodate the transfer of power from a driving member to a driven member at any of several speed ratios. Such transmissions normally include a fluid control valve circuit interconnecting the servo mechanisms with a fluid pressure source, and the circuit is normally characterized by one or more shift valves capable of selectively directing fluid pressure to the various servo mechanisms of the transmission to effect the various shift sequences. The shift valves may be made sensitive to vehicle engine torque and vehicle speed by subjecting the same to a vehicle speed responsive governor pressure and to an opposed throttle pressure, the latter being produced by a personally operable throttle valve element which modulates the control pressure supplied by the fluid pressure source.

During operation, the torque capacity of the various servo mechanisms must be sufficient to accommodate the delivery of engine torque under any of a variety of operating conditions. Accordingly, it is customary to employ a regulator valve means in the circuit for varying the magnitude of the effective control pressure in proportion to the output torque of the engine thereby correspondingly varying the degree to which the servo mechanisms are energized. The above mentioned throttle pressure is caused to act upon the regulator valve means to supply the latter with an engine torque signal thereby giving rise to such a pressure regulating characteristic. The regulator valve, the shift valve and the throttle valve mutually cooperate in this manner to energize the various servo mechanisms in the proper sequence and in the proper degree.

It is desirable to design the various servo mechanisms and the cooperating valve elements so that the torque capacity of the various servo mechanisms will be substantially equal to the torque requirements during the initial stages of the shift sequence. A pressure in excess of this optimum value will result in an unduly rough shift pattern, whereas a pressure less than this optimum value will allow excessive slipping during the initial stages of the shift sequence. This excessive slipping would then be followed by an abrupt change in the control pressure as the control pressure is allowed to increase to its maximum regulated value. According to a principal feature of our instant invention, we have provided a servo mechanism of the type above described wherein the holding effort of the servo mechanism may be progressively increased following the initial engagement of the gear engaging member with the associated gear element of the transmission thereby causing the angular velocity of the gear element to change from one value to another during the shift sequence with a maximum degree of smoothness and with a minimum time being required to accomplish the sequence.

The provision of a gear controlling means of the type above described being a principal object of our invention, it is a further object of our invention to provide a servo mechanism capable of utilizing the effective control pressure made available by the above described mutually cooperating valve elements, regardless of magnitude, to hold the associated gear elements with a holding effort which varies within the optimum limits necessary to effect a smooth transition from one gear ratio to another.

It is another object of our invention to provide a servo mechanism of the type above described wherein the time necessary to change the speed of the associated gear elements from that speed associated with one speed ratio to that associated with another speed ratio will be of a minimum value.

It is a further object of our invention to provide a servo mechanism which embodies the features above set forth and which is capable of being adapted to existing transmissions to improve the automatic shifting characteristics of the same.

It is a further object of our invention to provide a servo mechanism as above set forth which is simple in construction and which require a minimum of adjustment or other maintenance during operation.

Our improved servo mechanism can be incorporated in a three speed, overdrive transmission although many other types of automatic mechanisms may also effectively utilize the improved structure of our invention. Further, the servo mechanism of our invention as herein described is applied to a brake assembly for braking a planetary gear member of an automatic transmission to the stationary transmission housing, but we contemplate that the principles of our invention may also be applied to a clutch mechanism capable of clutching together cooperating portions of a gear unit to accommodate the delivery of torque through the same.

Figure 1:
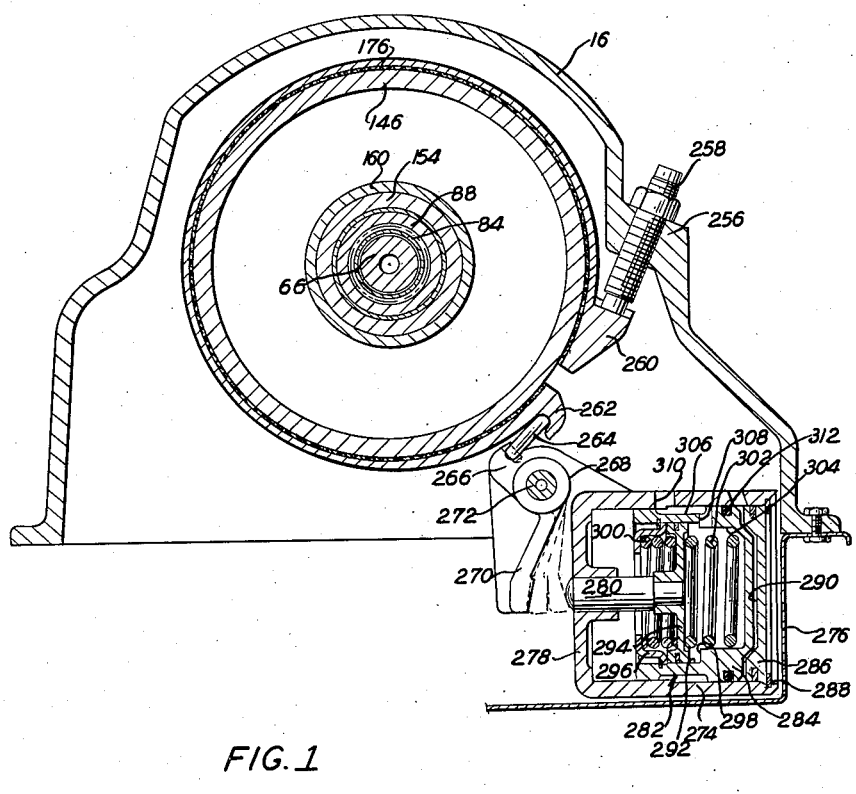

For the purpose of more particularly describing the features of a preferred embodiment of our invention, reference will be made to the accompanying drawings wherein:

Figure 1 is a partial cross sectional view showing the brake and brake servo construction of our instant invention; and, Figure 2 is a graphical representation of the operating characteristics of the servo of our invention.

Referring first to Figure 1, the brake band can be used as a reaction member for the sun gear of the overdrive gear unit. A certain time lapse will occur after the overdrive shift valve assumes the overdrive position before the brake band 176 engages the overdrive brake drum member 146. Thereafter the pressure on the apply side of the overdrive servo will increase. Since it is neccessary to decelerate the overdrive sun gear 154 and the overdrive member 146 from a relatively high angular velocity to a stationary position during the overdrive shift, such a sudden increase in the pressure on the apply side of the overdrive servo would cause an undesirable torque reaction, and the shifting sequence would be lacking in smoothness. We have therefore mode provision for allowing the pressure to increase only to a predetermined magnitude following a shift of the overdrive shift valve to the overdrive position. Thereafter the pressure is allowed to gradually increase over a predetermined time interval during which the required deceleration of the rotating components of the overdrive unit takes place. After the rotating components of the overdrive unit have reached or approached a zero angular velocity, the pressure may then be allowed to increase to a maximum value as determined by the main regulator valve and its associated components. In examining Figure 2 it will be assumed that point $t=0$ on the abscissa corresponds to the instant when the overdrive shift valve moves to the overdrive position. As the brake band is moved toward the engaged position, the servo pressure remains substantially constant and at a reduced magnitude. At point "A" in Figure 2, the overdrive brake band engages member 146 and the pressure immediately increases to a value represented by point "B," assuming that the engine throttle position is at the wide open setting. The magnitude of the pressure at point "B" will be substantially equal to that required to overcome the torque reaction to which the overdrive servo is subjected under wide open throttle conditions. Therefore, the rotating portions of the overdrive unit will begin to decelerate and the rate of deceleration progressively increases as the magnitude of the control pressure increases from point "B" to point "C." It is contemplated that the angular velocity of the rotating portions of the overdrive unit will be zero when point "C" is reached. Thereafter the control pressure may be allowed to increase to its maximum value.

If the engine is operating in any throttle setting other than the wide open setting, the magnitude of the control pressure available in the control circuit will be reduced as previously explained. Also the torque requirements of the clutch and brake servo mechanism, including the overdrive servo, will be correspondingly reduced and therefore the pressure necessary to overcome the torque reaction of the overdrive unit is of a reduced value. If it is assumed that the engine is operating at a throttle setting near the closed throttle position, the pressure will increase from point "A" to a value indicated by point "D" in Figure 2 which is substantially less than the previous value shown at point "B." The torque capacity of the overdrive unit at point "D" is substantially equal to but not greater than the torque requirements at closed throttle, and the rotating portions of the overdrive unit decelerate at a progressively increasing rate as the control pressure varies as indicated up to point "E." Typical values for the control pressures are indicated in Figure 2 along the ordinate.

Referring next to Figure 1 the structural characteristics of the servo mechanism of our instant invention giving rise to the relationship illustrated in Figure 2 is shown in particular detail. The transmission housing 16, as seen in Figure 1, surrounds the brake band 176 and the overdrive planetary member 146 and it is formed with a shoulder portion 256 in which an adjustable anchoring screw 258 is positioned. One end of the brake band 176 is formed with an anchoring abutment 260 adapted to engage the adjustable screw 258. The other end of the brake band 176 is formed with an adapter 262 capable of receiving a force transmitting link 264 disposed between the anchor member 262 and an arm 266 of a band operating lever 268. The lever 268 further includes an arm 270 depending from the pivotal support 272, the latter preferably being fixed to the housing 16.

A servo cylinder 274 is secured to the lower portion of the housing 16 within a sheet metal enclosure 276 housing the control valve elements. The cylinder 274 is formed with an end wall 278 at one axial side thereof which is centrally apertured to slidably receive a piston rod 280. The lever arm 270 is disposed in the path of movement of the piston rod 280 and is adapted to be adjustably positioned about the pivotal support 272 as indicated by means of dotted lines in Figure 1.

A piston assembly generally designated by numeral 282 is slidably disposed within the cylindrical housing 274, and it is comprised of an outer piston member 284. The other end of the cylindrical housing 274 is closed by a closure plate 286 and held in place by a snap ring 288 or by any other suitable fastening means, said closure plate 286 and piston member 284 defining therebetween a fluid working chamber shown at 290.

The interior of the piston member 284 is formed with a cylindrical section 292 within which is slidably positioned a second piston member 294. A circular spring seat member 296 is positioned within the cylindrical section 292 as indicated and is held in place by a snap ring as indicated. The piston member 294 is capable of being moved with respect to the outer piston member 284 within the relative axial positions defined by the spring seat member 296 and by an annular shoulder 298 formed in the interior of the inner piston member 284. A first compression spring 300 is disposed between the seat member 296 and the inner side of the inner piston member 294, and a second spring 302 is disposed between the inner wall of the outer piston member 284 and the other side of the inner piston member 294.

The inner and outer piston members 294 and 284 respectively define therebetween an accumulator chamber, designated by numeral 304, which communicates with an outer peripheral groove 306 through a port 308. The groove 306 in turn communicates with a control pressure passage through a port 310 to accommodate the delivery of control pressure to the accumulator chamber 304. Similarly the working chamber 290 communicates with a control pressure passage through a port 312 to accommodate the delivery of servo pressure to the servo mechanism.

The inside diameter of the cylindrical housing 274 on the left side of the annular groove 306, as viewed in Figure 1, is slightly smaller than the inside diameter of the remaining portion of the cylindrical housing thereby creating an area differential over which the control pressure in the accumulator chamber 304 and in the passage 198 may act to create a servo retracting force for de-energizing the mechanism.

In operation, when fluid pressure is applied to the working chamber 290 in the manner previously described to establish an overdrive speed ratio, the piston assembly 282 will be moved to the left as viewed in Figure 1 until the slack in the brake mechanism is taken up. When the brake initially engages the overdrive planetary member 146 the outer piston member 284 will move inwardly with respect to the inner piston member 294 to relieve the spring tension of spring 300 and to compress spring 302. These springs function to progressively increase the holding effort of the brake band 176, and this is accompanied by a progressively increasing buildup in the working chamber 290 to give the characteristics shown in Figure 2. During the time interval in which relative movement takes place between the piston members 284, and 294, the rotating planetary elements decelerate and when the inner piston member 294 engages the annular shoulder 298, the control pressure in the working chamber 290 increases to the maximum value determined by the main regulator valve.

By preference, the spring 302 is calibrated so that it exerts zero force between the piston members when the inner piston member 294 contacts the spring seat member 296. Also, by preference, the spring 300 is designed so that it exerts a zero force on the piston members when the inner piston member 294 engages the shoulder 298. When the engine is not running, and when the control pressure is zero, the inner piston member 294 assumes a neutral position intermediate the annular shoulder 298 and the spring seat member 296. When control pressure exists in the fluid circuit, the pressure in the accumulator chamber 304 urges the piston members into the relative position illustrated in Figure 1.

It is emphasized that the servo structure of our instant invention is capable of utilizing the control pressure established by the main regulator valve and the associated valve components to establish that optimum initial braking effort in the overdrive planetary elements which is necessary to obtain maximum smoothness in the shifting sequence. It is also capable of thereafter increasing the braking effort according to the uniform linear relationship illustrated in Figure 4 independently of the magnitude of the pressure level.

Having thus described the principal features of the preferred embodiment of our invention, what we claim and desire to secure by United States Letters Patent is:

1. A fluid pressure responsive servo comprising a cylinder, dual piston means slidably positioned in said cylinder including a pair of relatively movable piston members, one of said piston members having portions with differential diameters which define an annular area, positively acting mechanical means for transmitting the force acting on said piston means to a servo actuated element, said piston members defining therebetween an accumulator chamber, means for supplying fluid pressure to said cylinder and for creating a pressure force on said piston means and for pressurizing said accumulator chamber, and spring means for urging said piston members toward a relatively neutral position with provision for accommodating relative movement in either of opposed directions from said neutral position, the pressure in said accumulator acting on said annular area to normally bias said dual piston means toward an inoperative position.

2. A fluid pressure responsive servo comprising a cylinder, piston means slidably positioned in said cylinder including a pair of relatively movable piston members, said piston members defining in part two separate pressure chambers, separate pressure passages extending to each pressure chamber in parallel relationship for pressurizing said chambers thereby producing a fluid pressure force for biasing said piston means, spring means interposed between said piston members to accommodate a limited restrained relative movement of the same, and coupling means for mechanically connecting one of said piston members to a servo operated element.

3. In a control mechanism, a pressure responsive actuator adapted to adjustably position an element of said mechanism, said actuator including a pressure cylinder, a piston assembly comprised of two relatively movable piston members movably disposed in said cylinder, said piston members defining in part two separate pressure chambers, separate pressure passages extending to each pressure chamber in parallel relationship for pressurizing said chambers thereby producing a fluid pressure force for biasing said piston assembly, a mechanical coupling between said element and one of said piston members, and a spring means interposed between said piston members to provide a resilient connection therebetween.

4. In a control mechanism, a pressure responsive actuator adapted to adjustably position an element of said mechanism, said actuator including a pressure cylinder, a piston assembly in said cylinder comprising two piston members, means for providing limited lost motion between said piston members from one limiting relative position to another, fluid conduit structure communicating with said cylinder for accommodating the delivery of control pressure to the same to actuate said piston asssembly, means for mechanically coupling one of said piston members and said element, and spring means between said piston members for resiliently opposing said lost motion and for urging said piston members toward a balanced neutral position intermediate said limiting relative positions.

5. A servo mechanism including a cylinder, a piston assembly disposed in said cylinder, said piston assembly including a pair of relatively movable piston members, spring means for resisting relative movement between said piston members, said piston members defining therebetween an accumulator chamber, a mechanical connection between one of said piston members and a servo actuated member, and conduit structure communicating with said cylinder for accommodating the delivery of control pressure to the same and for pressurizing said accumulator chamber, one of said piston members moving with respect to the other in opposition to the resisting force of said spring means upon an increase in the control pressure thereby stressing said spring means to provide a progressively increasing servo actuating force.

6. A servo mechanism including a cylinder, a piston assembly slidably disposed in said cylinder and defining therewith a fluid working chamber, conduit means communicating with said cylinder for accommodating the delivery of control pressure to the latter, said piston assembly including a pair of relatively movable piston members, spring means interposed between said piston members for urging the latter toward a balanced relative position, a mechanical connection between one of said piston members, and a servo actuated member, said relatively movable piston members defining therebetween an accumulator chamber, said conduit means including separate pressure passages extending to said accumulator chamber and said working chamber, the fluid pressure in said accumulator chamber opposing relative movement between said piston members whereby the effective servo actuating force initially assumes a magnitude of reduced degree and is followed by a progressive increase in magnitude to a final operating level determined by the magnitude of the pressure made available to said cylinder, the rate of increase in the actuating force being independent of the operating pressure level.

7. A fluid pressure servo for a gear control element of a multiple speed power transmission comprising a housing, a piston assembly slidably disposed in said housing, said piston assembly including a pair of telescopically related piston elements defining therebetween an accumulator chamber, a mechanical connection between one of said piston members and an externally situated driven portion of said servo, a first passage means for admitting fluid control pressure into said housing on one side of said piston assembly, a second passage means situated in parallel relationship with respect to said first passage means for admitting fluid control pressure into said accumulator chamber, and spring means interposed between said piston members for modifying the net fluid pressure forces produced by said control pressure.

8. A fluid pressure servo for a gear control element of a multiple speed power transmission comprising a housing, a piston assembly slidably disposed in said housing, said piston assembly including a pair of telescopically related piston elements defining therebetween an accumulator chamber, a mechanical connection between one of said piston members and an externally situated driven portion of said servo, conduit structure interposed between a source of regulated control pressure and said housing, said conduit structure including a first passage means for directing control pressure to one side of said piston assembly and a second passage means independent of said first passage means and situated in parallel relationship therewith for directing fluid pressure to said accumulator chamber, valve means situated in and partly defining said conduit structure for selectively distributing control pressure to said first passage means and for exhausting the same, and spring means situated between said piston members on at least one side of said one piston member for resiliently opposing relative movement between said piston members upon a build up in control pressure on said one side of said piston assembly.

9. A servo mechanism comprising a housing defining in part a fluid working chamber, a piston assembly slidably disposed in said housing, said piston assembly being comprised of a first hollow piston member, a second piston member positioned within said first piston member in concentric relationship therewith, said piston members defining a pressure chamber therebetween, passage means for separately and independently pressurizing said pressure chamber and said working chamber, a mechanical connection between said second piston member and a driven portion of said servo mechanism, said piston members being relatively movable between two limiting relative positions, spring means for respectively urging each of said piston members toward a separate one of said relative positions, said first piston member having differential diameter parts which define an annular area, and passage means for continuously subjecting said piston members to fluid pressure to urge the same toward one of said relative positions and for continuously pressurizing said annular area to normally bias said piston members to an inoperative position.

10. A servo mechanism comprising a housing defining in part a fluid working chamber, a piston assembly slidably disposed in said working chamber, said piston assembly being comprised of a first hollow piston member, a second piston member positioned within said first piston member, a mechanical connection between said second piston member and a driven portion of said servo mechanism, means for accommodating a relative lost motion of said piston members between two relative positions, spring means for resiliently opposing said lost motion, said piston members defining therebetween an accumulator chamber of variable volume, fluid conduit means for accommodating the delivery of control pressure to said housing including separate passage portions extending respectively to said accumulator chamber and to said working chamber on one side of said first piston member, said accumulator chamber being continuously pressurized, and valve means disposed in part in the passage portion extending to said working chamber for controlling the distribution of pressure to said working chamber.

11. A servo mechanism comprising a housing defining in part a fluid working chamber, a piston assembly slidably disposed in said housing, said piston assembly being comprised of a first hollow piston member, a second piston member positioned within said first piston member, a mechanical connection between said second piston member and a driven portion of said servo mechanism, means for accommodating a relative lost motion of said piston members between two limiting relative positions, spring means for resiliently opposing said lost motion, said piston members defining therebetween an accumulator chamber of variable volume, and fluid conduit structure for accommodating the delivery of control pressure to said housing, said conduit structure including separate passage portions extending respectively to said accumulator chamber and to said working chamber whereby said working chamber is adapted to be selectively energized and deenergized independently of said accumulator chamber.

12. A servo mechanism comprising a housing defining in part a fluid working chamber, a piston assembly slidably disposed in said housing, said piston assembly being comprised of a first hollow piston member, a second piston member positioned within said first piston member, a mechanical connection between said second piston member and a driven portion of said servo mechanism, means for accommodating a relative lost motion of said piston members between two limiting relative positions, spring means for resiliently opposing said lost motion, said piston members defining therebetween an accumulator chamber of variable volume, and fluid conduit structure for accommodating the delivery of control pressure to said housing, said conduit structure including first and second portions extending respectively to said accumulator chamber and to said working chamber on one side of said first piston member, said piston members being provided with longitudinally spaced portions of differential diameter defining an annular working area, the control pressure in said first passage portion acting on said annular area to produce a piston assembly retracting force for returning the piston assembly to an inoperative position when the control pressure is exhausted from said working chamber.

13. A servo mechanism comprising a housing defining in part a fluid working chamber, a piston assembly slidably disposed in said housing, said piston assembly being comprised of a first hollow piston member, a second piston member positioned within said first piston member, a mechanical connection between said second piston member and a driven portion of said servo mechanism, means for accommodating a relative lost motion of said piston members between two relative positions, spring means for resiliently opposing said lost motion including separate spring elements situated on each of opposed sides of said second piston member and acting between said first and second piston members, said piston members defining therebetween an accumulator chamber of variable volume, and fluid conduit means for accommodating the delivery of control pressure to said housing including separate passage portions extending respectively to said accumulator chamber and to said working chamber on one side of said first piston member.

14. A fluid pressure responsive servo comprising a cylinder, said cylinder defining in part a pressure working chamber, dual piston means slidably positioned in said piston and including a pair of relatively movable piston members, said piston members defining therebetween an accumulator chamber, positively acting mechanical means for transmitting the force acting on said piston means to a servo actuated element, means for supplying fluid pressure to said accumulator chamber to continuously pressurize the same, and means for providing controlled pressure distribution to said working chamber.

References Cited in the file of this patent

UNITED STATES PATENTS

| 2,197,075 | Fitzgerald | Apr. 16, 1940 |
| 2,265,546 | Price | Dec. 9, 1941 |
| 2,386,220 | Lawler et al. | Oct. 9, 1945 |
| 2,645,135 | Frank | July 14, 1953 |
| 2,757,640 | White | Aug. 7, 1956 |
| 2,768,503 | Snyder | Oct. 30, 1956 |

FOREIGN PATENTS

| 307,793 | Italy | May 15, 1933 |
| 518,052 | Belgium | Mar. 14, 1953 |

UNITED STATES PATENT OFFICE
CERTIFICATION OF CORRECTION

Patent No. 2,966,888

January 3, 1961

Zbigniew J. Jania et al.

It is hereby certified that error appears in the above numbered patent requiring correction and that the said Letters Patent should read as corrected below.

Column 2, line 68, for "mode" read -- made --; column 5, line 7, for "Figure 4" read -- Figure 2 --; column 8, line 39, for "piston" read -- cylinder --.

Signed and sealed this 11th day of July 1961.

(SEAL)
Attest:

ERNEST W. SWIDER
Attesting Officer

DAVID L. LADD
Commissioner of Patents